US012258807B2

(12) United States Patent
Schwitalla et al.

(10) Patent No.: US 12,258,807 B2
(45) Date of Patent: Mar. 25, 2025

(54) BUILDING WALL MODULE WITH AUTOMATIC DOORS FOR USERS AND POSTAL DELIVERY

(71) Applicant: Inventio AG, Hergiswil (CH)

(72) Inventors: Max Schwitalla, Ebikon (CH); Florian Trosch, Erlenbach ZH (CH); Jonas Vonaesch, Lucerne (CH)

(73) Assignee: INVENTIO AG, Hergiswil (CH)

(*) Notice: Subject to any disclaimer, the term of this patent is extended or adjusted under 35 U.S.C. 154(b) by 158 days.

(21) Appl. No.: 18/006,577

(22) PCT Filed: Jul. 29, 2021

(86) PCT No.: PCT/EP2021/071236
§ 371 (c)(1),
(2) Date: Jan. 24, 2023

(87) PCT Pub. No.: WO2022/023459
PCT Pub. Date: Feb. 3, 2022

(65) Prior Publication Data

US 2023/0272658 A1 Aug. 31, 2023

(30) Foreign Application Priority Data

Jul. 31, 2020 (EP) .................................... 20188853

(51) Int. Cl.
*E05F 15/00* (2015.01)
*E05F 15/60* (2015.01)
(Continued)

(52) U.S. Cl.
CPC .............. *E05F 15/60* (2015.01); *E05F 15/73* (2015.01); *E04B 1/82* (2013.01); *E04B 1/94* (2013.01);
(Continued)

(58) Field of Classification Search
CPC .... E05F 15/60; E05F 15/70; E05Y 2201/434; E05Y 2400/61; E05Y 2400/40;
(Continued)

(56) References Cited

U.S. PATENT DOCUMENTS 10,837,212 B2 * 11/2020 Hucker ................. E05F 1/1253
11,248,410 B2 * 2/2022 Dreyer .................... E05F 15/73
(Continued)

FOREIGN PATENT DOCUMENTS

DE 10163061 A1 6/2003
EP 2025854 A2 2/2009
(Continued)

OTHER PUBLICATIONS

R. Jeremias et al., A CMOS Photosensor Array for 3D Imaging Using Pulsed Laser, 2001 IEEE International Solid- State Circuits Conference, Feb. 6, 2001, pp. 252-253, Session 15, IEEE, United States of America.

*Primary Examiner* — Chi Q Nguyen
(74) *Attorney, Agent, or Firm* — William J. Clemens; Shumaker, Loop & Kendrick, LLP

(57) ABSTRACT

A building wall module for partitioning a first region from a second region has a frame structure with inner and outer wall panels and lateral fastening devices for connecting the building wall module to a building. In addition, a sliding door system and a secondary door system are integrated in the frame structure, wherein the secondary door system is arranged separated from the sliding door system and can be controlled separately from the control device of the sliding door system. An electrical interface device connects the building wall module to a building system of a building.

14 Claims, 3 Drawing Sheets

(51) Int. Cl.

| | |
|---|---|
| ***E05F 15/73*** | (2015.01) |
| *E04B 1/82* | (2006.01) |
| *E04B 1/94* | (2006.01) |

(52) U.S. Cl.
CPC ..... *E05Y 2201/434* (2013.01); *E05Y 2400/40* (2013.01); *E05Y 2400/85* (2013.01); *E05Y 2800/71* (2013.01); *E05Y 2900/14* (2013.01)

(58) Field of Classification Search
CPC ........... E05Y 2900/132; E05Y 2400/85; E05Y 2800/71; E05Y 2900/14; E04B 1/82; E04B 1/94
See application file for complete search history.

(56) References Cited

U.S. PATENT DOCUMENTS

| | | | | |
|---|---|---|---|---|
| 11,384,588 | B2 * | 7/2022 | Soderqvist | H02P 7/04 |
| 11,735,075 | B2 * | 8/2023 | Lee | G09F 19/04 49/31 |
| 2005/0028946 | A1 * | 2/2005 | Weishar | E05F 15/643 160/214 |
| 2014/0259929 | A1 * | 9/2014 | Farrell | E05D 15/0621 49/404 |
| 2015/0355828 | A1 * | 12/2015 | Kiyomasa | G06F 3/0482 715/771 |
| 2016/0376826 | A1 * | 12/2016 | Wu | G08B 13/08 340/547 |
| 2017/0067280 | A1 * | 3/2017 | Thomas | E06B 3/481 |
| 2019/0003236 | A1 * | 1/2019 | Hall | E05F 15/77 |
| 2020/0137592 | A1 * | 4/2020 | Guo | H04B 7/0404 |
| 2022/0112760 | A1 * | 4/2022 | Demele | E05B 65/0888 |
| 2023/0323723 | A1 * | 10/2023 | Guevara Rosas | G01S 7/40 49/31 |

FOREIGN PATENT DOCUMENTS

| | | | |
|---|---|---|---|
| EP | 2876241 | A1 | 5/2015 |
| FR | 3071533 | A1 | 3/2019 |
| WO | 2009139016 | A2 | 11/2009 |
| WO | 2010112586 | A1 | 10/2010 |
| WO | 2018069341 | A1 | 4/2018 |
| WO | 2020126644 | A1 | 6/2020 |

* cited by examiner

6 DRIVE UNIT 7 INTERFACE DEVICE 8 CONTROL DEVICE 10 SENSOR UNIT
12 BUILDING SYSTEM 14 IDENTIFICATION DEVICE 33 DRIVE UNIT

Fig. 3A
Fig. 3B
Fig. 3C
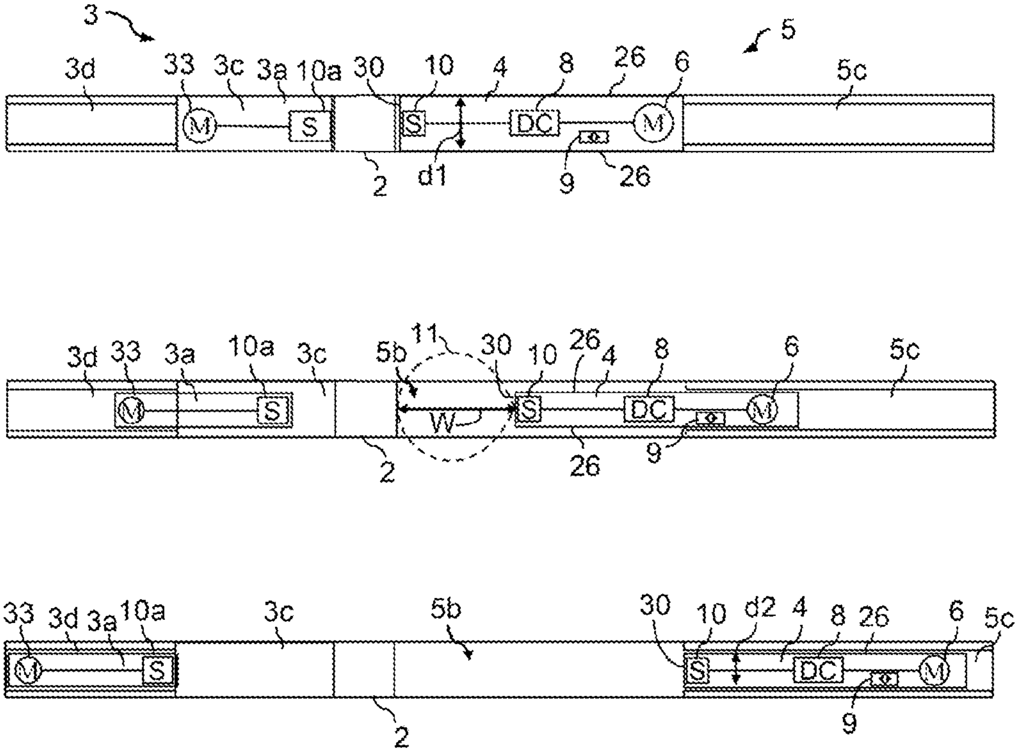
6 DRIVE UNIT 8 CONTROL DEVICE 9 ACTUATOR 10 SENSOR UNIT
10a SENSOR DEVICE 33 DRIVE UNIT
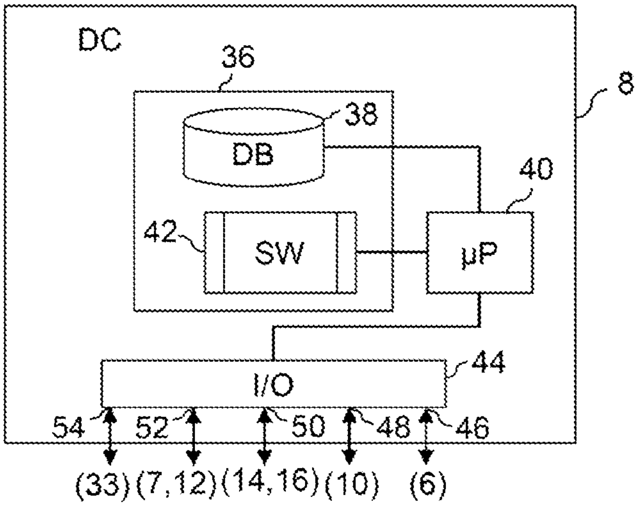
Fig. 4
8 CONTROL DEVICE 36 STORAGE DEVICE 38 STORAGE REGION DATABASE
40 PROCESSOR 42 STORAGE REGION COMPUTER PROGRAMS
44 INTERFACE DEVICE

BUILDING WALL MODULE WITH AUTOMATIC DOORS FOR USERS AND POSTAL DELIVERY

FIELD

The technology described herein relates in general to the technical equipment of a building. Embodiments of the technology relate in particular to the technical building equipment, in order to control access to the building or to a building interior, and a method for operating the technical building equipment.

BACKGROUND

Buildings can be equipped in a very wide variety of ways, in order to control access to the building or access to an interior within the building. The equipment can for example relate to the way in which access is granted or denied to people—for example, by doors, locks, or barriers. It is known, for example, to install a door frame (door jamb) at an intended location, and to insert a door therein, when constructing a building wall that is made from masonry, concreted, and/or produced in drywall installation (e.g., a wood and/or metal construction in conjunction with gypsum boards).

A system formed from the door frame and the door is generally equipped with a closing or locking system (lock) which allows access to the door only for access-authorized persons with a "key" fitting the lock. The equipment of a building may therefore also relate to the way in which persons (users) must identify themselves as access-authorized, e.g., using a mechanical and/or electronic key, a magnetic card, a chip card or an RFID card, or using a mobile electronic device (e.g., mobile phone). It is known, for example, that an electronic lock is arranged on a door, at which an access code must be entered so that the door can be unlocked and opened. WO 2010/112586 A1 describes an access control system in which a user who is authorized to enter is shown an access code on a display on a mobile phone that the user carries. If the user holds the mobile phone up to a camera such that the camera can capture the displayed access code, the access control system grants the user access if the access code is valid.

In addition to this unlocking function on a door, it is known to monitor passage through the door. WO 2018/069341 A1 describes, for example, a device that uses sensors to monitor whether and which objects are moving through a door. The object identification device determines the geometric dimensions of an object (person, car) in order to determine how far the door needs to be opened for the object to pass through. The aim is to ensure the comfort and safety of the passing object; for example, a person walking or driving should feel safe when passing through the door.

The systems mentioned relate to different demands on the technical building equipment with regard to access to the building and to building interiors. In addition to these known requirements, there are further requirements, for example, due to changing lifestyles or living conditions (e.g., dense living in apartments in a city), including a need for greater flexibility, increased security, and increasing automation of and in buildings. The requirements for a building also relate to the construction costs and construction time. There is therefore a need for a technology for technical building equipment that meets these requirements without negatively influencing the comfort for users.

SUMMARY

One aspect of such a technology relates to a building wall module for partitioning a first region from a second region, which module has a defined length L, height H, and depth T. The building wall module comprises a frame structure, a sliding primary door system (also referred to below as the "sliding door system", a secondary door system, and an electrical interface device. The frame structure has lateral fastening devices, a first wall panel facing the first region, and a second wall panel facing the second region, wherein the first wall panel is arranged substantially in parallel with the second wall panel. The fastening devices are provided for connecting the building wall module to a building. The sliding door system has a door frame integrated into the frame structure, which door frame has a passage region and a wall shell region, a sliding door displaceable in the door frame between a closed position and an open position, wherein the wall shell region at least partially receives the sliding door in the open position, a first electromechanical drive unit, and a control device. The first electromechanical drive unit and the control device are configured to control the displacement of the sliding door. The electrical interface device is connected to the control device and configured to electrically connect the building wall module to a building system of a building. The secondary door system is integrated into the frame structure and is arranged separately from the sliding door system. The secondary door system has a secondary door, is connected to the control device and is configured to be controlled by the control device.

A further aspect of the technology relates to a method of operating a building wall module of this kind. According to the method, a credential presented by a user or by an object is detected by means of an identification device of the sliding door system. The control device of the sliding door system checks whether a user profile is created for the credential in a database. If a user profile is created for the received credential, it is determined whether the credential authorizes access to the sliding door system or the secondary door system, in order to determine a door to be actuated. The electromechanical drive unit associated with the door to be actuated is actuated by the control device in order to open the door to be actuated, wherein the door to be actuated is released from the substantially closed position into the open position.

The technology described here creates a building wall module in which two, separately actuatable door systems are arranged, a sliding door system, and a secondary door system. These door systems enable the building wall module to be used for various application; for example, the sliding door system can be used as an entry and exit for authorized users or objects (e.g., robots). The secondary door system can be used for mail and goods delivery, for example. In this building module, a single electrical interface device establishes the electrical connection to the building. The building wall module can be transported as a unit to the building, in order to be mechanically and electrically connected to the building in a time-saving manner.

In one embodiment, the building wall module is configured such that, from a user's perspective, the secondary door is smaller than the sliding door or has smaller dimensions. The passage region of the door frame has a first width and a first height, and a door region of the secondary door system has a second width and a second height. The second width is smaller than the first width, and/or the second height is less than the first height. While, for example, the passage region for the sliding door system can be predetermined by a building standard, the size of the secondary door system can be adjusted to the planned use.

In one embodiment of the building wall module, the control device of the sliding door system also controls the secondary door system—in particular, its second electromechanical drive unit. The second electromechanical drive unit and the control device are configured to actuate the secondary door such that it is released or blocked. Thus, in the building wall module, a control device controls the two door systems. The same also applies to an identification device which is provided for determining a credential in the building wall module—in particular, in the sliding door system.

The identification device can be flexibly adapted to the situation required in a building. The identification device can, for example, comprise a transceiver for radio signals, a device for capturing a biometric feature, a device for capturing an optical code, a reader for a magnetic stripe card or a chip card, and/or a keypad or a touch-sensitive screen for manually entering a password.

In one embodiment of the building wall module, the secondary door system is also configured as a sliding door system. Substantially the same technology can thus be used for both door systems. The building wall module thus offers the advantage that the zones along the building wall module can be used without building planning having to take into account a door opening to the outside or inside.

In one embodiment, the building wall module comprises a compartment which has a fixed spatial volume projecting into the first region and is connected to the first wall panel. The secondary door system is configured to release or block access to the compartment. The compartment can be used in conjunction with the secondary door system—for example, for mail and goods delivery. Depending upon the desired use, the spatial volume can be adjusted to the planned requirement. Several compartments can also be arranged one above the other.

In one embodiment, a door having a closing device is present on a partition wall projecting into the first region, wherein the door, in an unlocked state, enables access to the compartment from the first region. Additional mail and goods can be easily removed from the first region; as a result, they are securely stored there. In one embodiment, the compartment can be configured such that it comprises individual compartments separated from one another; these compartments can be allocated to different users.

The building wall module can be used instead of a conventional building wall. The building wall module is therefore configured, with regard to load-bearing capacity (e.g., when used as a supporting wall), fire protection, sound protection or sound insulation, thermal insulation, and burglary protection, such that it has properties which, depending upon the use and building, correspond to those of a conventional building wall. For this purpose, both interior spaces of the sliding door system and interior spaces of the secondary door system can be equipped with fire protection and/or sound protection material.

DESCRIPTION OF THE DRAWINGS

Various aspects of the improved technology are described in greater detail below with reference to embodiments in conjunction with the drawings. In the drawings, identical elements have identical reference signs. In the drawings:

FIG. 3A is a schematic, horizontal cross-section of an embodiment of the building wall module having two sliding door systems, the sliding doors of which are closed;

FIG. 3B is a schematic view of the sliding doors of FIG. 3A in an intermediate position;

FIG. 3C is a schematic view of the sliding doors of FIG. 3A in an open position;

FIG. 4 is a schematic view of an embodiment of a control device for the building wall module shown in FIG. 1.

DETAILED DESCRIPTION

Figure 1:
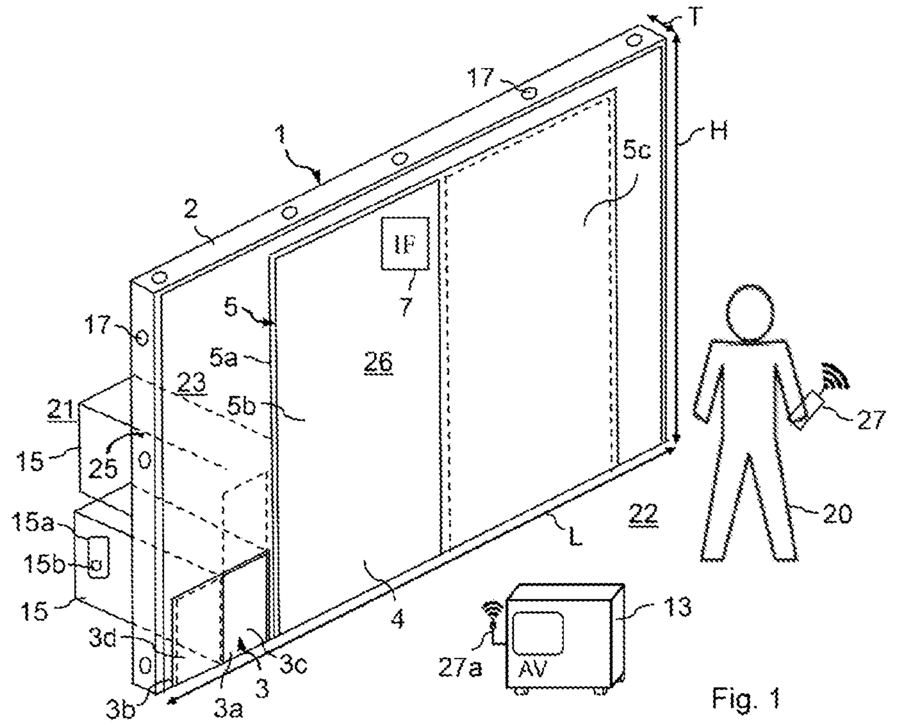
FIG. 1 is a schematic perspective view of an embodiment of a building wall module, in front of which a user and a robot are located.

FIG. 1 is a schematic perspective view of an embodiment of a building wall module 1 for partitioning a first region 21 from a second region 22. The building wall module 1 is configured to be used in a building instead of a building wall constructed from masonry, concreted, and/or in drywall installation (e.g., a wood, plastic, composite material, and/or metal construction in conjunction with, e.g., gypsum boards). Such types of construction are known to a person skilled in the art. In one embodiment, the building wall module 1 can be a building inner wall, e.g., it can separate the private inner region of an apartment (e.g., the first region 21) from a (non-private) outer region (e.g., hallway or stairwell) (e.g., the second region 22) in an apartment building. Similarly, the building wall module 1 can be used, for example, as a building inside wall in an office building, hotel, or the like; in a hotel, the building wall module 1 can separate two adjacent rooms, for example. In another embodiment, the building wall module 1 can be a building outer wall, e.g., it can separate the inner region (e.g., the first region 21) of a non-public building (e.g., a residential building, hotel, business building, or the like) from the public outer region (e.g., a road or a public space) (e.g., the second region 22). In the following, the first region 21 is designated as the inner region 21, and the second region 22 is referred to as the outer region 22.

For illustration purposes, the building wall module 1 is shown in FIG. 1 in conjunction with a situation given, by way of example, in which a user 20 and an object 13 are located in front of the building wall module 1, i.e., in the outer region 22. In FIG. 1, the object 13 is shown, by way of example, as an autonomous vehicle (AV); the autonomous vehicle can also be referred to as a robot. A person skilled in the art recognizes that, in another embodiment, the object 13 can be an autonomous aircraft (drone). Such autonomous vehicles, robots, and aircraft are equipped to drive or fly independently and without the influence of a person and to navigate to a programmed target. A person skilled in the art recognizes that, in another embodiment, the object 13 can also be a pet. In the embodiment shown, the user 20 and the object 13 are each equipped with a radio device 27, 27*a*, as is explained in more detail at another point in this description.

In the embodiment shown, the building wall module 1 comprises a frame structure 2, a sliding primary door system 5 (also referred to below as the "sliding door system"), an electrical interface device 7, and a secondary door system 3, wherein the secondary door system 3 enables access to a compartment 15, i.e., the access to the compartment 15 is released or blocked. In the embodiment shown, the secondary door system 3 is arranged close to the ground—for example, to allow access to an autonomous vehicle 13 or a pet. The secondary door system 3 can also be arranged at a different height in order to allow access, for example, to a drone or the user 20. A person skilled in the art recognizes that the compartment 15 is configured according to the arrangement of the secondary door system 3.

The compartment 15 has a fixed spatial volume which projects into the first region 21 and is connected to the wall panel 25. At a partition wall projecting into the first region 21, the compartment 15 has a lockable door 15*a* through which the compartment 15 is accessible from the first region 21. The door 15*a* can, for example, be arranged laterally (x-direction), frontally (when viewed from the region 21), at the top, or, if the compartment 15 is not arranged on the ground or close to the ground, below. A person skilled in the art recognizes that the door 15*a* can be configured as required, and that more than one door 15*a* can be present. The door 15*a* has a closing device 15*b* by which the door 15*a* can be locked and unlocked from the region 21. The closing device 15*b* can be configured in a manner known to a person skilled in the art.

The compartment 15 is not limited to the embodiment shown in FIG. 1. In one embodiment, the compartment 15 can consist of several individual compartments, which can be arranged, for example, next to one another and/or one above the other. With reference to FIG. 1, 3-5 individual compartments of this kind can, for example, be arranged one above the other. The individual compartments can be allocated to different users 20.

In the situation shown in FIG. 1, the user 20 and the object 13 may be authorized to access the inner region 21 at the sliding door system 5, e.g., because the user 20 lives or works there, and the object 13 belongs to a user who is living or working there, delivers an article to him, or collects an article from him. Alternatively, only the user 20 may be authorized to access the inner region 21 at the sliding door system 5, whereas the object 13 may be authorized only to access the secondary door system 3. In this case, depending upon the configuration of the building wall module 1 and control of the access, the object 13 can enter the compartment 15, for example, via an open secondary door system 3, and from there enter the inner region 21. Access to the secondary door system 3 can also be controlled in such a way that the object 13 can only deposit an article into the compartment 15 or retrieve it from there when the secondary door system 3 is open. In one embodiment, a corresponding control can apply to the user 20, i.e., the user 20 can be access-authorized only at the secondary door system 3, in order to deposit an article into the compartment 15 or to retrieve it from there when the secondary door system 3 is open. In the present description, the term, "access," has the meaning of entering a space, going into it, reaching into it, depositing something in it, or removing something from it.

A wall panel 25 (hereafter referred to as wall inner panel 25) facing the inner region 21, and a wall panel 23 (hereafter referred to as wall outer panel 23) facing the outer region 22, and lateral fastening devices 17 are arranged on the frame structure 2. The wall inner panel 25 is arranged substantially in parallel with the wall outer panel 23, and the fastening devices 17 are provided for connecting the building wall module 1 to the building. In relation to the x-y-z coordinate system shown in FIG. 2, the building wall module 1 has a length L in the x-direction, a depth T in the y-direction, and a height H in the z-direction; the building wall system 1 extends in a plane which is spanned by the x- and z-axes.

The sliding door system 5 comprises a door frame 5*a* integrated into the frame structure 2, which door frame has a passage region 5*b* and a wall shell region 5*c*. A sliding door 4 is displaceable in the door frame 5*a* between a closed position and an open position, wherein the wall shell region 5*c* at least partially receives the sliding door 4 in the open position. The secondary door system 3 is integrated into the frame structure 2 and is arranged and controllable separately from the sliding door system 5. The secondary door system 3 comprises a secondary door 3*a* which can also assume a closed position and an open position. FIG. 3A-FIG. 3C show, by way of example, different positions of the sliding door 4 and the secondary door 3*a*; in this case, the secondary door 3*a* is also configured as a sliding door. In these illustrations given by way of example, the secondary door 3*a* is (horizontally) displaceable in the x-direction; in another embodiment, the secondary door 3*a* may be (vertically) displaceable in the z-direction. In a further embodiment, the secondary door 3*a* can be configured as a swing door having a vertically or horizontally aligned hinge.

A person skilled in the art recognizes that the dimensions of the building wall system 1, and in particular its height H and length L, can be adjusted to building-specific specifications. For the passage region 5*b* of the sliding door system 5, standard widths or minimum widths can be specified, depending upon the building. Since the wall region 5*c* substantially completely receives the sliding door 4 in the open position, a length (width) of the wall region is thus also predetermined. The same applies to the secondary door system 3 when it is equipped with a sliding door 3*a*, wherein a width of a door region 3*c* is substantially freely configurable. In the embodiment shown in FIGS. 1 and 2, the passage region 5*b* of the sliding door system 5 is of the (first) width W and a (first) height, and the door region 3*c* of the secondary door system 3 is of a (second) width and a second height. Depending upon the embodiment, the second width is smaller than the (first) width W, and/or the second height is less than the first height. A person skilled in the art recognizes that the length or width and height of the secondary door system 3 are adjusted to the planned use (e.g., for mail, parcel, and goods delivery and/or access for the object 13); the secondary door 3*a* can, for example, be of a similar height to the sliding door 4.

Figure 2:
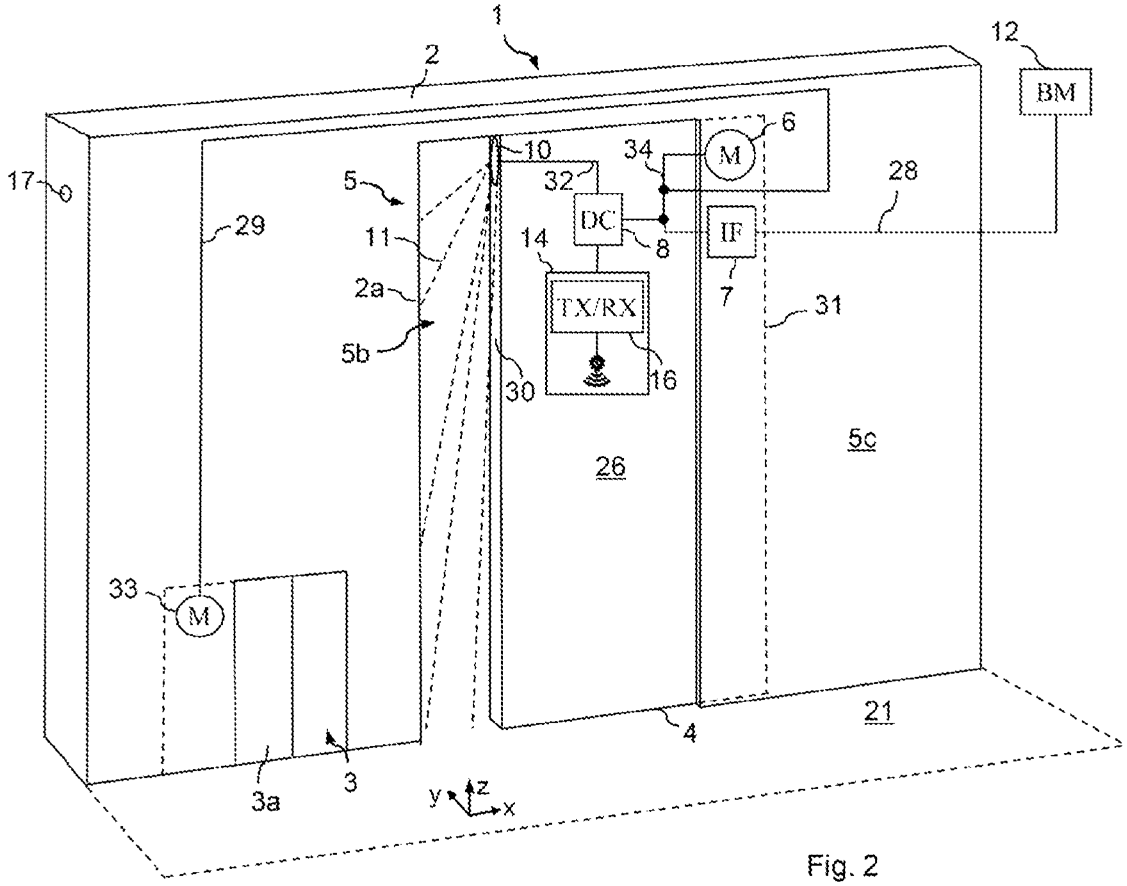
FIG. 2 is a schematic view of the building wall module in which system components, by way of example, are arranged.

The electrical interface device 7 (IF) shown schematically in FIG. 1 is configured to electrically connect the building wall module 1 to a building system 12 of the building, shown in FIG. 2. In one embodiment, the building wall module 1 is supplied with electrical energy exclusively by means of the electrical interface device 7. In one embodiment, the electrical interface device 7 is furthermore configured for communication between the building system 12 and the building wall module 1—for example, for checking an access authorization and an associated actuation of the building wall module 1. In one embodiment, the communication between the building system 12 and the building wall module 1 takes place exclusively by means of the electrical interface device 7. Further components of the building wall module 1 and the functions thereof are described elsewhere in this description—inter alia, in conjunction with FIG. 2.

Since the building wall module 1 can be used instead of one of the conventional building walls mentioned, the building wall module 1 is configured in terms of load-bearing capacity (e.g., when used as a load-bearing wall), fire protection, sound protection or sound insulation, thermal insulation, and burglary protection, such that it has properties which, depending upon the use and buildings, correspond to those of a conventional building wall. The building wall module 1 can be made of a material or a combination of different materials which fulfill these properties to a defined degree. In one or more interior spaces of the building wall module 1, an insulation material (e.g., mineral or synthetic type) can, for example, be arranged, and/or wall surfaces can be made of non-combustible or flame-retardant material (e.g., metal or gypsum).

The manner in which the building wall module 1 is to be connected to the building depends upon which of the mentioned construction types the building, or the environment in which the building wall module 1 is to be situated, is created from. The fastening devices 17 can, for example, be holes or recesses, into which screws can be inserted in order to screw the building wall module 1 to the building. In another embodiment, the fastening devices 17 can be configured as struts or bolts, in order to brick in or concrete in the devices, and thus the building wall module 1. A person skilled in the art recognizes that the circular fastening devices 17 shown in FIG. 1 and the number thereof are given by way of example.

In the situation shown in FIG. 1, the technology described herein can be used in an advantageous manner. Firstly, access to the private or non-public inner region 21 can be easily granted to the user 20 by means of the sliding door system 5. The secondary door system 3 can be used, for example, by delivery services (e.g., for mail and goods delivery by persons or an autonomous vehicle or aircraft (drone)), in order to deposit articles in the compartment 15; for the delivery, the secondary door system 3 is opened and then closed again. In one embodiment, the compartment 15 is separated from the inner region 21 in an access-proof manner (i.e., the delivery person cannot reach the inner region 21) and, after the closing, also from the outer region 22; the user 20 can therefore also be absent during delivery, without worrying about unauthorized access to the inner region 21 or removal from the compartment 15. In one embodiment, the compartment 15 has a lockable door to the inner region 21, which door can be opened by the user 20 in order to remove, for example, deposited mail or goods.

Secondly, the technology described here offers the advantage that the building wall module 1 can replace an entire building wall or at least a large part thereof that is provided for access to the inner region 21. The building wall module 21 comprises all system components which are required for this purpose, wherein the electrical interface device 7 is provided as a single electrical connection to the building. The building wall module 1 can thus be transported as a unit to the building, in order to be mechanically and electrically connected to the building in a time-saving manner on-site.

The sliding door 4 has two, substantially parallel door leaves 26 (on an inner side and an outer side of the sliding door 4, respectively). The door leaves 26 are spaced apart from one another (in the y-direction) such that there is an inner space, between the door leaves 26, in which system components and insulating material, e.g., for soundproofing and fire protection, can be arranged. The door leaves 26 can be connected to one another in the region of an end face 30, which points in the direction of the passage region **5*b*. Each of the door leaves 26** extends in parallel with the x-z plane.

FIG. 2 is a schematic view of the building wall module 1 in which system components, given by way of example, are arranged. In addition to the electrical interface device 7 already mentioned, the system components of the sliding door system 5 comprise a control device 8 (DC), an identification device 14 (TX/RX), and a first drive unit 6 (M). In one embodiment, the sliding door system 5 is connected to the building system 12 (BM); in the embodiment shown in FIG. 2, this connection takes place by means of an electrical connection 28. The building wall module 1 is supplied with electrical energy via this connection 28. In one embodiment, operation of the building wall module 1 can be ensured by the supplied energy, without external control signals or control commands being supplied to it. In this embodiment, system components which check, for example, a key, an access code, or another type of access authorization are integrated (locally) in the building wall module 1 such that it can be operated autonomously, apart from the electrical energy.

In another embodiment, external control signals or control commands can be supplied to the building wall module 1—for example, in conjunction with the checking of an access authorization. In this embodiment, the electrical interface device 7 is furthermore provided for communication between the building system 12 and the building wall module 1. For this purpose, the electrical connection 28 comprises a communications network to which the building system 12 and the interface device 7 are coupled. The building system 12 may comprise a computer-assisted building management system in which data of access-authorized users 20 and objects 13 are stored. A person skilled in the art recognizes that, for this purpose, the building system 12 can be coupled to an IT infrastructure for what is known as cloud computing (also known as the "cloud" in colloquial terms). This includes, for example, storing data in a remote data center but also executing programs that are installed remotely rather than locally. Depending upon the configuration, a certain functionality can be made available, for example, in the controller 8 or via the "cloud." For this purpose, a software application or program parts thereof can be executed in the "cloud," for example. The controller 8 then accesses this infrastructure via the interface device 7, as required, in order to execute the software application.

In one embodiment, the electrical connection 28 can comprise an electronic bus system. In one embodiment, the electrical connection of the sliding door system 5, including its supply with electrical energy, is established via the interface device 7. A person skilled in the art recognizes that several sliding door systems 5 can be provided in the building, and that each of these sliding door systems 5 is coupled to the electrical connection 28, in order to communicate with the building system 12, e.g., in conjunction with determining and checking access authorizations, if this is carried out centrally by the building management system.

In the embodiment shown, the sliding door 4 comprises a sensor unit 10, which is connected to the control device 8 by an electrical connection 32. The control device 8 is also connected to the drive device 6 and the interface device 7 by means of an electrical connection 34. The electrical connections 32, 34 are configured for signal and/or energy transmission; for this purpose, they can each comprise individual electrical lines or an electrical bus system.

The control device 8 is furthermore connected to the identification device 14. The identification device 14 is configured to detect a credential from the user 20 and the object 13, on the basis of which their access authorizations can be determined. Depending upon whether these are used by the user 20 or the object 13, credentials of this kind can, for example, be in the form of a physical key, a manually input password (e.g., a PIN code), a biometric feature (e.g., fingerprint, iris pattern, speech/voice characteristics), or an access code acquired from a magnetic card, chip card, or RFID card, or from an electronic device (NFC-, Bluetooth- or cellular network-based). The credential is presented by the user 20 and the object 13 when access to the inner region 21 is desired.

In accordance with the mentioned forms which the credentials can take, the credentials can be presented in different ways—for example, by a deliberate manual action (e.g., entering a PIN code or holding out an RFID card), or by approaching the sliding door 4 in order to come within radio range of the identification device 14 (e.g., for establishing an RFID or Bluetooth connection). The identification device 14 can be arranged on the sliding door 4 or in the vicinity thereof; it can be arranged, for example, on an outer side of the sliding door 4, such that it can acquire the credentials if the user 20 is in the outer region 22.

The identification device 14 is configured according to the credentials provided in the building. This means that the identification device 14 has, for example, a door cylinder, a device for capturing a biometric feature, a device for capturing an optical code, a reader for a magnetic stripe card or a chip card, a keypad or a touch-sensitive screen for manually entering a password, or a transceiver for radio signals. A person skilled in the art recognizes that, in one embodiment, the sliding door system 5 can have more than one identification device 14, each for a different type of credentials, or that one recognition device 14 is configured for several types of credentials.

In the embodiment shown in FIG. 1 and FIG. 2, the identification device 14 captures credentials, which a radio device 27 of the user 20 or a radio device 27*a* of the object 13 transmits as a radio signal. The radio signal can be transmitted in accordance with a known standard for radio communication (e.g., RFID, WLAN/WiFi, NFC, Bluetooth). Accordingly, the identification device 14 is configured to receive such a radio signal; for this purpose, a transceiver 16 and an antenna connected thereto are shown in FIG. 2.

The transceiver 16, alone or in conjunction with the controller 8, determines the credentials from the received radio signal, which is then used to determine the access authorization. If the credentials are valid, the user 20 is granted access to the sliding door 4; in this case, the control device 8 actuates the drive unit 6, which moves the sliding door 4 towards the open position. The user 20 can also be granted access to the secondary door 3*a*, in order to deposit mail or goods in the compartment 15; in this case, the control device 8 actuates a drive unit 33 of the secondary door system 3, which opens the secondary door 3*a*. If the credentials are not valid, the sliding door 4 and/or the secondary door 3*a* remain closed and locked. For the object 13, the verification of the credentials, and the operation of the sliding door 4 and/or the secondary door 3*a*, take place in an analogous manner. A person skilled in the art recognizes that the object 13 can also be granted access to the sliding door 4.

The sensor unit 10 is arranged on the end face 30 of the sliding door 4, wherein the arrangement of the sensor unit 10 can depend upon the sensor technology used. The sensor unit 10 can be configured, for example, as a light barrier, in order to detect the presence of an object (user 20, object 13, or another article). The light barrier extends along the end face 30. In another embodiment, the sensor unit 10 can comprise a depth sensor (3D camera). Such a depth sensor can be arranged in a region of an upper corner or edge of the sliding door 4. From this elevated region, the sensor unit 10 has an optimized detection field 11 in the direction of the passage region 5*b* and the floor. A detection field 11, by way of example, is shown in FIG. 2 (vertical, x-z plane) and in FIG. 3B (horizontal, x-y plane). In addition, the sensor unit 10 is better protected in this region from dirt and damage (e.g., from vandalism).

An electrical sensor signal generated by the sensor unit 10 depends upon whether the passage region 5*b* is free or is blocked by the user 20 or an object. If the passage region 5*b* is free, the control device 8 initiates the closing of the sliding door 4 according to a predetermined procedure. In the case of a blocked passage region 5*b*, the closing process is not initiated, or, if it is already initiated, is interrupted by the control device 8. Depending upon the configuration of the building, the control device 8 can also generate an acoustic and/or visible optical alarm in the event of a blocked passage region 5*b*.

If, in one embodiment, the sensor unit 10 comprises a 3D camera, this can be based upon the principle of time-of-flight measurement (ToF sensor). The 3D camera comprises a light-emitting diode unit or laser diode unit which, for example, emits light in the infrared range, wherein the light is emitted in short pulses (e.g., several tens of nanoseconds). The 3D camera also comprises a sensor group consisting of a number of light-sensitive elements. The sensor group is connected to a processing chip (e.g., a CMOS sensor chip), which determines the time of flight of the emitted light. The processing chip simultaneously measures the distance to a number of target points in space in a few milliseconds.

The 3D camera can also be based upon a measuring principle according to which the time-of-flight of emitted light is captured via the phase of the light. The phase position when the light is emitted and when it is received is compared, and the time elapsed or the distance to the reflecting object is determined therefrom. For this purpose, a modulated light signal is preferably emitted, instead of short light pulses. Further details on measurement principles are given, for example, in the following publications: "Fast Range Imaging by CMOS Sensor Array Through Multiple Double Short Time Integration (MDSI)," P. Mengel et al., Siemens AG, Corporate Technology Department, Munich, Germany, and "A CMOS Photosensor Array for 3D Imaging Using Pulsed Laser," R. Jeremias et al., 2001 IEEE International Solid-State Circuits Conference, p. 252. A person skilled in the art would recognize that, as an alternative to such a 3D camera, another device can also be used for determining the object distance—for example, a device based upon electromagnetic waves in the radio wavelength range (radar).

Some of the mentioned system components (control device 8, sensor unit 10, identification device 14, interface device 7) are arranged on the sliding door 4 and move along with the sliding door 4; at least a part of the drive unit 6 can also be arranged on the sliding door 4, in order to move it relative to the door frame 5*a*. In one embodiment, the control device 8 is arranged in a region between the door leaves 26—for example, in the region of a rear side 31, opposite the end face 30, of the sliding door 4. In one embodiment, the rear face 31 of the sliding door 4 is not visible from the outside, because the sliding door 4 can be wider than the passage region 5*b*, and the rear face 31 therefore remains in the wall shell region 5*c*, even in the closed position of the sliding door 4. The drive unit 6 and the interface device 7 can also be arranged in the region. The electrical connections 32, 34 are accordingly arranged between the door leaves 26 and are not visible from the outside. However, the technology described here is not restricted to this arrangement of the components, which is mentioned by way of example.

In one embodiment, the sliding door system 3 comprises the sliding door 3*a*, wherein the sliding door system 3 is configured to be mechanically analogous to the sliding door system 5; i.e., the sliding door system 3 has a door frame 3*b* integrated into the frame structure 2, which door frame has a door region 3*c* and a wall shell region 3*d*. The electromechanical drive unit 33 is arranged on the sliding door 3*a* and is connected to the control device 8 of the sliding door system 5 by means of an electrical connection 29. The drive unit 33 and the control device 8 are configured to actuate the secondary door 3*a* such that it is released or blocked. In one embodiment, the control device 8 of the sliding door system 5 generates the control signals and/or control commands required for the operation of the secondary door 3*a*. The control device 8 checks or initiates a check, for example, of whether a presented credential is valid for the secondary door 3*a*, and this can then be opened. Depending upon the embodiment of the sliding door system 3, it can also comprise a sensor device; such a sensor device can be configured analogously to the sensor device 10 and its function.

The functionalities of the sliding door systems 3, 5 are described below with reference to FIGS. 3A-3C, on the basis of an embodiment of the building wall system 1. In this case, the description is predominantly based upon the sliding door system 5; the functioning of the sliding door system 3 corresponds to that of the sliding door system 5. FIGS. 3A-3C are each schematic views of a horizontal cross-section of an embodiment of the building wall module 1 having the sliding door systems 3, 5. Each of these views shows the components which the sliding door 4 comprises (sensor unit 10 (S), control device 8 (DC) and drive unit 6 (M)); for the purpose of illustration, the interface device 7 and the connection thereof to the building system 12 are not shown. The drive unit 6 and the control device 8 are arranged inside the sliding door 4, and in particular between the door leaves 26. The wall shell region 5*c* having the structure for receiving the sliding door 4 in the open position is also shown in FIGS. 3A-3C. From the sliding door system 3 are also shown the sliding door 3*a*, the drive unit 33, the sensor device 10*a* (S), the door region 3*c*, and the wall shell region 3*d* having a structure for receiving the sliding door 3*a* in the open position.

The sensor unit 10 is arranged on the end face 30. The arrangement is selected such that the electromagnetic radiation (light or radio waves) can propagate unhindered towards the passage region 5*b* during operation. The sensor unit 10 can, e.g., be inserted into a recess in the end face 30 and protected from damage and dirt by a radiation-permeable cover. The electrical connection 32 (FIG. 1) between the sensor unit 10 and the control device 8 and the electrical connection 34 (FIG. 1) extend within the sliding door 4—for example, between the door leaves 26.

The embodiment shown of the sliding door system 5 is based upon a principle that is similar to a principle known from EP 2876241 A1. The document describes a sliding door system in which two opposing door surfaces are coupled to an actuator which moves the door surfaces towards or away from one another. In relation to the sliding door system 5 according to the technology described here, this means that the two door leaves 26 have a leaf spacing d1 when the sliding door 4 is in the closed position. During the opening of the sliding door 4, the two door leaves 26 are moved towards one another by means of an actuator 9 (FIGS. 3A-3C) until they have a leaf spacing d2, which is dimensioned such that the sliding door 4, when in the fully or partially open position (FIG. 3B and FIG. 3C) thereof, has such a small thickness that it fits into the receiving structure of the wall shell region 5*c*. The leaf spacing d1 is greater than the leaf spacing d2. If the sliding door 4 is pushed out of the wall shell region 5*c*, the two door leaves 26 are moved away from one another (spread apart) such that the sliding door 4 assumes a defined thickness when closed (FIG. 3A). The thickness is determined in such a way that the outer sides of the two door leaves 26, in the closed position, are substantially flush with the outer sides of the wall shell region 5*c* or the cladding thereof (wall outer panel 23, wall inner panel 25). As a result, a substantially smooth finish is achieved on both wall sides in the door region.

In one embodiment, the sliding door system 5 has, on a door cross member, a guide device, which supports the sliding door 4 and guides it on its path between the closed position and the open position. The sliding door 4 has a complementary device on its upper edge. The guide device and the complementary device cooperate when the drive unit 6 causes the sliding door 4 to move and acts on the complementary device; they can, for example, form a system having a telescopic extension. The drive unit 6 can comprise, for example, a motorized or pneumatic sliding drive which acts on the telescopic extension.

In one embodiment, the two door leaves 26 are moved towards or away from one another by the actuator 9. The actuator 9 can comprise a spreading device which is activated mechanically, electrically, or electro-mechanically. The spreading device is configured to move the door leaves 26 towards one another when the sliding door 4 is to be opened, and to move them away from one another when the sliding door 4 is to be closed. A person skilled in the art would recognize that other spreading devices can also be provided instead—for example, cylinders actuated by a pressure medium.

FIG. 4 is a schematic view of an embodiment of the control device 8 for the building wall module 1 shown in FIG. 1. The control device 8 has an interface device 44 (I/O) which is electrically connected to a processor 40 (μP) and has several terminals 46, 48, 50, 52, 54 for input and output signals. The terminal 46 is connected to the drive unit 6, the terminal 48 to the sensor unit 10, the terminal 50 to the identification device 14, the terminal 52 to the building management system 12 via the interface device 7, and the terminal 54 to the drive unit 33 of the secondary door system 3.

The controller 8 also comprises a storage device 36 which is electrically connected to the processor 40. In the embodiment shown, the storage device 36 has a storage region 38 for a database (DB), and a storage region 42 for one or more computer programs (SW) for operating the sliding door system 5 and the secondary door system 3. In one embodiment, the operation of the sliding door system 5 comprises, for example, opening the sliding door 4 as a function of the recognized user 20. The computer program can be executed by the processor 40.

The database stores one or more associated datasets for the user 20 and the object 13 that are authorized to access the sliding door 4 and/or the secondary door 3*a*. A stored dataset of this kind is also referred to below as a user profile. Depending upon whether it is for the user 20 or the object 13, the user profile comprises specific data, e.g., name of the user 20, operator object 13, access authorization to the sliding door 4 and/or the secondary door 3, an opening width W (see FIG. 3B) up to which the sliding door 4 is to be opened, information on the credential (key number, PIN code, access code, including biometric data), and possibly time access restrictions (e.g., access from Monday to Friday, from 7:00 to 20:00). If several users 20 and objects 13 are authorized to access the sliding door 4 and/or the secondary door 3*a*, the database stores a user profile for each user 20 and each object 13. As an alternative to creating a user profile in the database of the storage device 36, a user profile can be created in a database of the building management system, wherein the control device 8 is able to access the database by means of the electrical connection 28. An authorized user 20 can create and manage such user profiles for himself and further users and/or objects 13 assigned to him. For example, an access code for the secondary door system 3 can be transmitted to a delivery service (user 20 or object 13). In another embodiment, a building manager may create and manage the user profiles.

Figure 5:
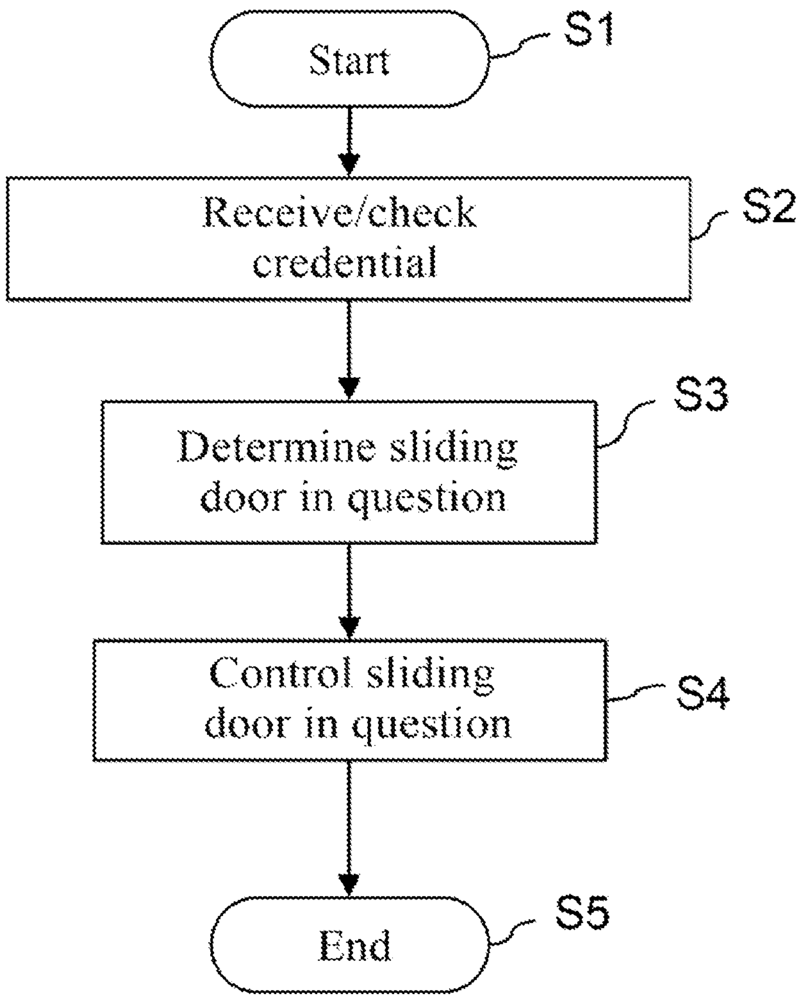
FIG. 5 is a flowchart of an embodiment of a method for operating the building wall module.

With the understanding of the basic system components described above and their functions, a method, by way of example, for operating the access building wall module 1, proceeding from the situation shown in FIG. 1, is described below in conjunction with FIG. 5. The description is given by way of example in conjunction with the radio device 27 of the user 20 and the radio device 27*a* of the object 13, wherein these radio devices 27, 27*a* are activated and ready for use. The method shown in FIG. 5 begins with a step S1 and ends with a step S5. A person skilled in the art will recognize that the division into these steps is by way of example, and that one or more of these steps may be divided into one or more sub-steps, or that several of the steps may be combined into one step.

In a step S2, the identification device 14 receives a credential which is presented either by the user 20 or the object 13. The credentials can be provided and transmitted in one of the above-mentioned forms. In one embodiment, the credential is transmitted either by the radio device 27 of the user 20 or the radio device 27*a* of the object 13. The control device 8 checks whether a user profile has been created in the database 38 for the credential.

If this check reveals that a user profile is created for the received credential, in a step S3, it is determined whether the credential is authorized to access the sliding door 4 or the secondary door 3*a*. In addition, it can be determined whether restrictions and/or conditions are specified in the user profile—for example, an opening width W or a time access restriction.

In a step S4, the door (3*a*, 4) determined in step S3 is actuated. If the credential authorizes access to the sliding door 4, the drive unit 6 of the sliding door system 5 is actuated by the control device 8 in order to open the sliding door 4. If the credential authorizes access to the secondary door 3*a*, the drive unit 33 of the secondary door system 3 is actuated by the control device 8 in order to open the sliding door 3*a*. In this case, the determined door (3*a*, 4) is released from the substantially closed position into the open position. Controlled by the control device 8 and taking into consideration the width W stored in the user profile, the drive unit 6, for example, moves the sliding door 4 until the width W is reached.

In one embodiment, the control device 8 initiates the subsequent closing of the determined door (3*a*, 4)—for example, after expiration of a defined opening period and/or when the sensor device 10 indicates that the passage is free again. After closing, the determined door (3*a*, 4) is locked.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A building wall module for partitioning a first region from a second region, the building wall module comprising:

a frame structure including lateral fastening devices, a first wall panel facing the first region, and a second wall panel facing the second region, wherein the first wall panel is arranged parallel with the second wall panel and the fastening devices are adapted for connecting the building wall module to a building;

a sliding primary door system having a door frame integrated into the frame structure and having a passage region and a wall shell region, a sliding door displaceable in the door frame between a closed position and an open position, wherein the wall shell region at least partially receives the sliding door in the open position of the sliding door, a first electromechanical drive unit and a control device, wherein the first electromechanical drive unit and the control device control the displacement of the sliding door, an electrical interface device connected to the control device and configured to electrically connect the building wall module to a building system primary a secondary door system integrated into the frame structure and arranged separately from the sliding primary door system, the secondary door system being controllable separately from the sliding primary door system and having a secondary door, wherein the secondary door system is connected to the control device and is controlled by the control device.

2. The building wall module according to claim 1 wherein the passage region of the door frame has a first width and a first height, the secondary door system includes a door region having a second width and a second height, and the second width is smaller than the first width and/or the second height is smaller than the first height.

3. The building wall module according to claim 1 wherein the secondary door system includes a second electromechanical drive unit connected to the control device of the sliding primary door system, and the second electromechanical drive unit and the control device control the secondary door to at least one of release and block the secondary door.

4. The building wall module according to claim 3 wherein the secondary door system is a sliding door system that has a secondary door frame integrated in the frame structure, the secondary door frame having a door region and a wall shell region, the secondary door is a secondary sliding door displaceable in the secondary door frame between a closed position and an open position by the second electromechanical drive unit, and the wall shell region at least partially receives the secondary sliding door in the open position of the secondary sliding door.

5. The building wall module according to claim 4 wherein secondary sliding door includes an inner door leaf, an outer door leaf, and an actuator actuated by the second electromechanical drive unit to move the inner and outer door leaves towards one another during an opening movement of the secondary sliding door, a thickness of the secondary sliding door being reduced such that the secondary sliding door is received by the wall shell region of the secondary door frame, and the second electromechanical drive unit moving the inner and outer door leaves away from one another during a closing movement of the secondary sliding door thereby increasing the thickness of the secondary sliding door.

6. The building wall module according to claim 1 wherein the sliding door includes an inner door leaf, an outer door leaf, and an actuator actuated by the first electromechanical drive unit to move the inner and outer door leaves towards one another during an opening movement of the sliding door, a thickness of the sliding door being reduced such that the sliding door is received by the wall shell region, and the first electromechanical drive unit moving the inner and outer door leaves away from one another during a closing movement of the sliding door thereby increasing the thickness of the sliding door.

7. The building wall module according to claim 1 including a compartment having a fixed spatial volume that projects into the first region and is connected to the first wall panel, wherein the secondary door system is adapted to at least one of release and block access to the compartment.

8. The building wall module according to claim 7 wherein the compartment has a door with a closing device, the door being on a partition wall projecting into the first region, the door, in an unlocked state, enabling access to the compartment from the first region.

9. The building wall module according to claim 7 wherein the compartment has at least two individual compartments separated from one another.

10. The building wall module according to claim 1 wherein the sliding primary door system includes an identification device for determining a credential.

11. The building wall module according to claim 10 wherein the identification device includes at least one of a transceiver for processing radio signals, a device for capturing a biometric feature, a device for capturing an optical code, a reader for a magnetic stripe card or a chip card, and a keypad or a touch-sensitive screen for manually entering a password.

12. The building wall module according to claim 1 including a fire protection and/or sound protection material arranged in an interior space between the first wall panel and the second wall panel, the fire protection and/or sound protection material being selected according to building-specific specifications for the building.

13. The building wall module according to claim 1 including a fire protection and/or sound protection material is arranged between a first door leaf of the sliding door facing the first region and a second door leaf of the sliding facing the second region, the fire protection and/or sound protection material being selected according to building-specific specifications for the building.

14. A method for operating a building wall module according to claim 1, the method comprising the steps of:

receiving a credential, produced by a user or an object, with an identification device of the sliding primary door system;

checking, using the control device of the sliding primary door system, whether a user profile for the received credential is stored in a database;

when a user profile for the received credential is stored in the database, determining whether the received credential authorizes access to the sliding primary door system or to the secondary door system; and in response to determining access to the sliding primary door system is authorized, actuating the first electromechanical drive unit using the control device to open the sliding door from the closed position into the open position, and in response to determining access to the secondary door system is authorized, actuating a second electromechanical drive unit using the control device to open a secondary sliding door from a closed position into an open position.

* * * * *